(12) United States Patent
Murayama et al.

(10) Patent No.: US 8,284,497 B2
(45) Date of Patent: Oct. 9, 2012

(54) ZOOM LENS, OPTICAL APPARATUS, AND METHOD FOR MANUFACTURING ZOOM LENS

(75) Inventors: Norio Murayama, Musashino (JP); Sayako Yamamoto, Kawasaki (JP)

(73) Assignee: Nikon Corporation, Tokyo (JP)

( * ) Notice: Subject to any disclaimer, the term of this patent is extended or adjusted under 35 U.S.C. 154(b) by 90 days.

(21) Appl. No.: 12/987,110

(22) Filed: Jan. 8, 2011

(65) Prior Publication Data

US 2011/0170203 A1 Jul. 14, 2011

(30) Foreign Application Priority Data

Jan. 14, 2010 (JP) .................................. 2010-005900

(51) Int. Cl.
*G02B 15/14* (2006.01)
(52) U.S. Cl. ........................................ 359/687; 359/676
(58) Field of Classification Search .................. 359/676, 359/680–682, 687
See application file for complete search history.

(56) References Cited

U.S. PATENT DOCUMENTS

| 6,519,094 | B1 * | 2/2003 | Boku et al. | 359/687 |
| 2009/0040622 | A1 * | 2/2009 | Iwama | 359/687 |

FOREIGN PATENT DOCUMENTS

JP 2009-210691 A 9/2009

* cited by examiner

*Primary Examiner* — James Greece
(74) *Attorney, Agent, or Firm* — Miles & Stockbridge P.C.

(57) ABSTRACT

The present invention provides a zoom lens ZL comprising a first lens group G1 having positive refractive power, a second lens group G2 having negative refractive power, a third lens group G3 having positive refractive power, and a fourth lens group G4 having positive refractive power, the first lens group G1 including a negative meniscus lens L11 and a positive meniscus lens L12, the second lens group G2 including a negative meniscus lens L21, a biconcave negative lens L22 and a positive meniscus lens L23, and the fourth lens group G4 including one positive lens L41, and the refractive indexes of at least three lenses in the zoom lens ZL being greater than 1.9.

19 Claims, 14 Drawing Sheets

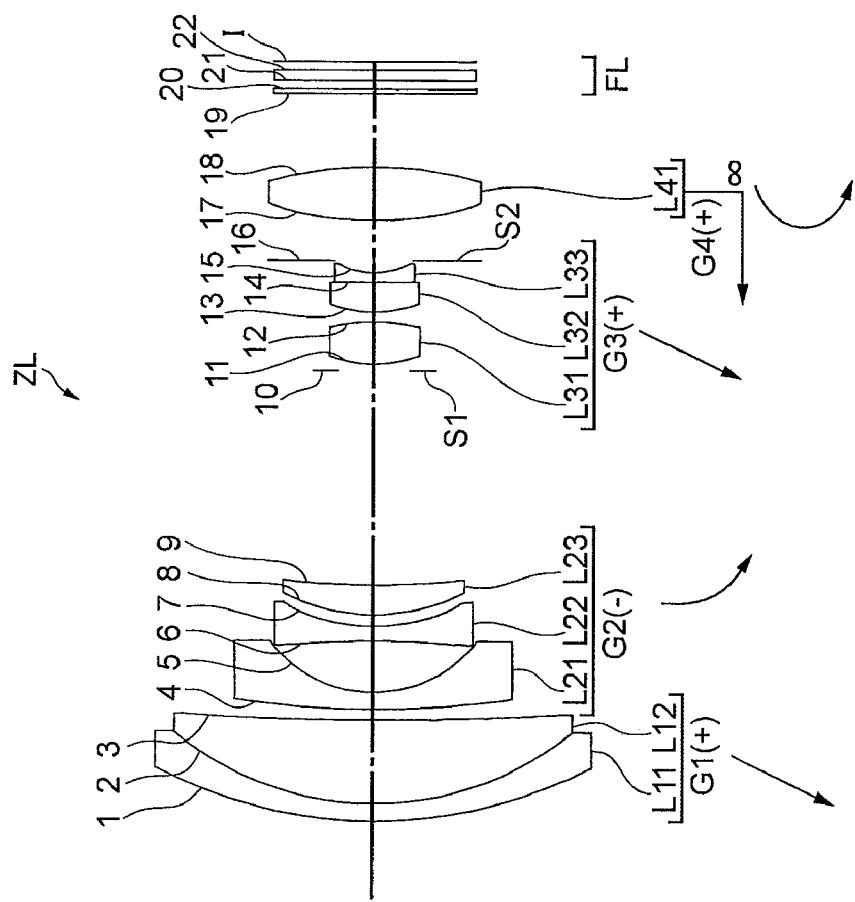

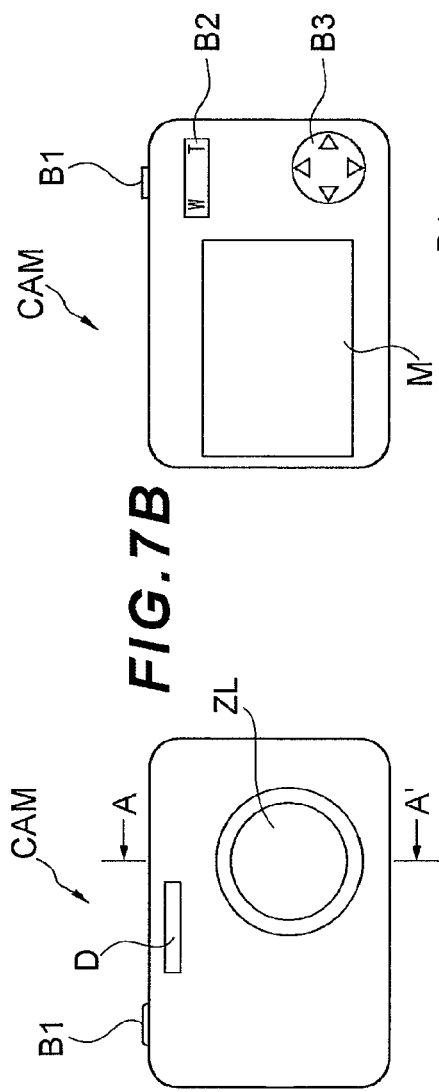
FIG.7A
FIG.7B
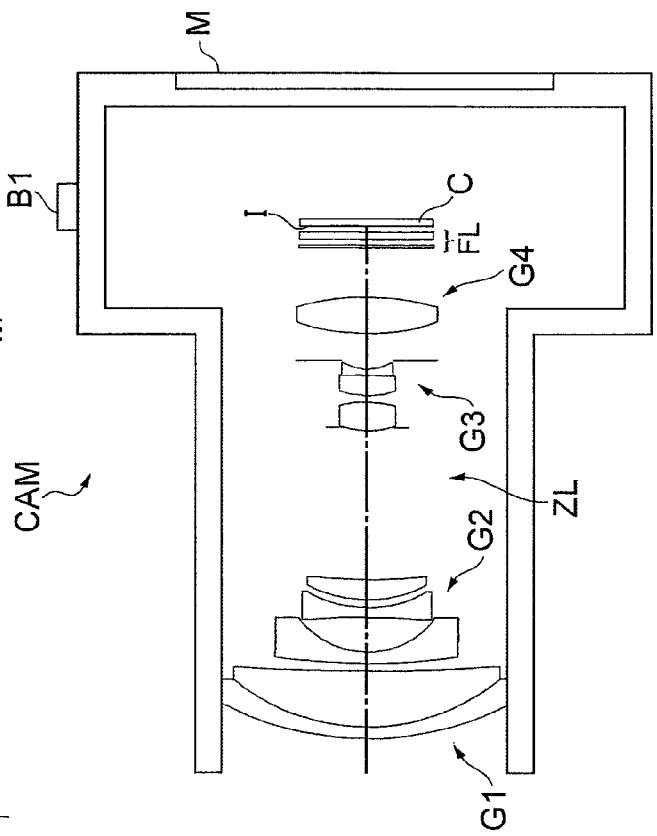
FIG.7C

ZOOM LENS, OPTICAL APPARATUS, AND METHOD FOR MANUFACTURING ZOOM LENS

INCORPORATION BY REFERENCE

This invention claims the benefit of Japanese Patent Application No. 2010-005900 which is hereby incorporated by reference.

FIELD OF THE INVENTION

The present invention relates to a zoom lens, an optical apparatus, and a method for manufacturing a zoom lens.

BACKGROUND OF THE INVENTION

Recently cameras using solid-state image sensors, such as video cameras, digital still cameras and cameras for broadcasting, and image pickup devices, such as cameras using silver halide film, are improving in terms of functions and downsizing. As an imaging optical system used for these image pickup devices, a zoom lens of which total lens length is short and resolution is high is demanded. As a zoom lens to satisfy these demands, a zoom lens comprising, in order from an object, a first lens group having positive refractive power, a second lens group having negative refractive power, a third lens group having positive refractive power, and a fourth lens group having positive refractive power, which performs zooming by moving each lens group, has been proposed (e.g. see Japanese Laid-Open Patent Publication No. 2009-210691).

However these conventional zoom lenses have a problem, that is the zoom ratio cannot be increased while maintaining excellent optical performance.

SUMMARY OF THE INVENTION

It is an object of the present invention to provide a zoom lens, an optical apparatus, and a method for manufacturing the zoom lens which is compact and has high optical performance while having a relatively high zoom ratio.

The zoom lens according to the present invention is a zoom lens comprising, in order from an object: a first lens group having positive refractive power; a second lens group having negative refractive power; a third lens group having positive refractive power; and a fourth lens group having positive refractive power, wherein a distance between the first lens group and the second lens group, a distance between the second lens group and the third lens group, and a distance between the third lens group and the fourth lens group change respectively upon zooming from a wide-angle end state to a telephoto end state, the first lens group includes, in order from the object, a negative lens and a positive meniscus lens having a convex surface facing the object, the second lens group includes, in order from the object, a first negative lens, a second negative lens, and a positive meniscus lens having a convex surface facing the object, the fourth lens group includes one positive lens, and the following conditional expressions being satisfied: $1.90 < Nd11 < 2.50$, $1.90 < Nda < 2.50$, and $1.86 < Ndb < 2.50$, where $Nd11$ denotes a refractive index of the negative lens closest to the object in the first lens group, $Nda$ denotes a refractive index of the lens closest to the object out of at least two lenses in the second lens group, the third lens group and the fourth lens group, and $Ndb$ denotes a refractive index of the lens closer to an image than the lens closest to the object out of the at least two lenses.

In the zoom lens, it is preferable that the following conditional expression is satisfied: $1.00 < TLt/ft < 1.80$, where $TLt$ denotes a total length of the zoom lens in the telephoto end state, and $ft$ denotes a focal length of the zoom lens in the telephoto end state.

In the zoom lens, it is preferable that the following conditional expression is satisfied: $0.20 < X1/ft < 0.60$, where $X1$ denotes a moving amount of the first lens group upon zooming from the wide-angle end state to the telephoto end state, and $ft$ denotes a focal length of the zoom lens in the telephoto end state.

In the zoom lens, it is preferable that the following conditional expression is satisfied: $4.00 < f1/fw < 8.00$, where $f1$ denotes a focal length of the first lens group, and $fw$ denotes a focal length of the zoom lens in the wide-angle end state.

In the zoom lens, it is preferable that the following conditional expression is satisfied: $0.80 < (-f2)/fw < 1.50$, where $f2$ denotes a focal length of the second lens group, and $fw$ denotes a focal length of the zoom lens in the wide-angle end state.

In the zoom lens, it is preferable that the following conditional expression is satisfied: $1.20 < f3/fw < 2.00$, where $f3$ denotes a focal length of the third lens group, and $fw$ denotes a focal length of the zoom lens in the wide-angle end state.

In the zoom lens, it is preferable that the following conditional expression is satisfied:
$2.00 < f4/fw < 5.00$, where $f4$ denotes a focal length of the fourth lens group, and $fw$ denotes a focal length of the zoom lens in the wide-angle end state.

In the zoom lens, it is preferable that the lens closest to the object out of the at least two lenses is one of the lenses of the second lens group.

It is preferable that the one of the lenses of the second lens group is a positive meniscus lens closest to the object in the second lens group.

It is preferable that the lens closer to the image than the lens closest to the object out of the at least two lenses is at least one of the lenses of the third lens group.

In the zoom lens, it is preferable that the first lens group has an aspherical surface.

In the zoom lens, it is preferable that the second lens group has an aspherical surface.

In the zoom lens, it is preferable that the third lens group has an aspherical surface.

In the zoom lens, it is preferable that the fourth lens group has an aspherical surface.

In the zoom lens, it is preferable that the fourth lens group is constituted by lenses formed of resin material.

In the zoom lens, it is preferable that the first lens group, the second lens group, the third lens group and the fourth lens group move along an optical axis respectively upon zooming from the wide-angle end state to the telephoto end sate, so that the distance between the first lens group and the second lens group increases, the distance between the second lens group and the third lens group decreases, and the distance between the third lens group and the fourth lens group increases.

In the zoom lens, it is preferable that an image of an object is formed on an imaging surface of a solid-state image sensor.

The optical apparatus according to the present invention is an optical apparatus comprising a zoom lens for forming an image of an object on a predetermined plane, and the zoom lens is the zoom lens according to the present invention.

Further, the method for manufacturing a zoom lens according to the present invention is a method for manufacturing a zoom lens by disposing, in order from an object, a first lens group having positive refractive power, a second lens group having negative refractive power, a third lens group having positive refractive power, and a fourth lens group having positive refractive power, wherein a distance between the first lens group and the second lens group, a distance between the second lens group and the third lens group, and a distance between the third lens group and the fourth lens group change respectively upon zooming from a wide-angle end state to a telephoto end state, the first lens group includes, in order from the object, a negative lens and a positive meniscus lens having a convex surface facing the object, the second lens group includes, in order from the object, a first negative lens, a second negative lens, and a positive meniscus lens having a convex surface facing the object, the fourth lens group includes one positive lens, and the following conditional expressions being satisfied: $1.90<Nd11<2.50$, $1.90<Nda<2.50$ and $1.86<Ndb<2.50$, where Nd11 denotes a refractive index of the negative lens closest to the object in the first lens group, Nda denotes a refractive index of the lens closest to the object out of at least two lenses in the second lens group, the third lens group and the fourth lens group, and Ndb denotes a refractive index of the lens closer to an image than the lens closest to the object out of the at least two lenses.

ADVANTAGEOUS EFFECTS OF THE INVENTION

According to the present invention, a zoom lens which is compact and has high optical performance can be obtained while having a relatively high zoom ratio.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will became more fully understood from the detailed description given herein below and the accompanying drawings which are given by way of illustration only and thus are not limitative of the present invention.

FIG. 3 is a diagram depicting a configuration and zoom locus of a zoom lens according to Example 2;

FIG. 7A is a front view of a digital still camera, FIG. 7B is a rear view of the digital still camera, and FIG. 7C is a cross-sectional view sectioned along the arrow A-A' in FIG. 7A.

DESCRIPTION OF EMBODIMENTS

Figure 1:
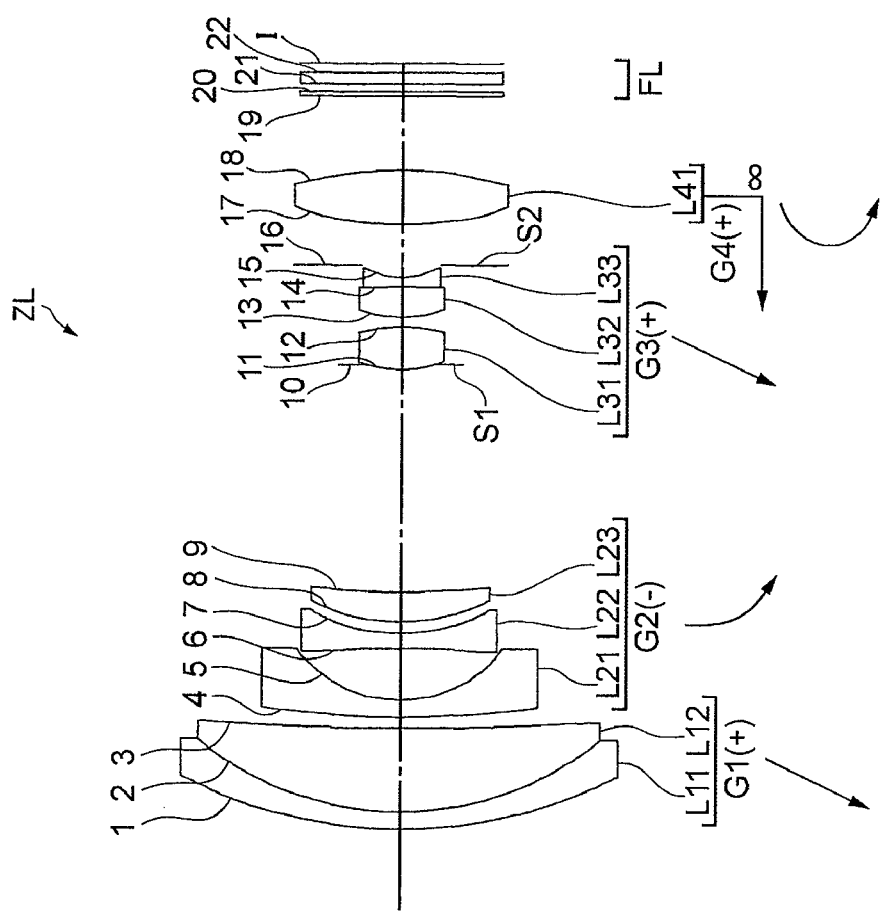
FIG. 1 is a diagram depicting a configuration and zoom locus of a zoom lens according to Example 1.

Preferred embodiments of the present invention will now be described with reference to the drawings. FIG. 7 shows a digital still camera CAM having a zoom lens according to the present invention. FIG. 7A shows a front view of the digital still camera CAM, FIG. 7B shows a rear view of the digital still camera CAM, and FIG. 7C shows a cross-sectional view sectioned along the arrow A-A' in FIG. 7A.

In the digital still camera CAM shown in FIG. 7, if a power button, which is not illustrated, is pressed, a shutter, which is not illustrated, of an image-capturing lens (ZL) is released, lights from an object are collected by the image-capturing lens (ZL), and form an image on a picture element C (e.g. CCD, CMOS), which is disposed on the image plane I. The object image formed on the picture element C is displayed on a liquid crystal monitor M disposed behind the digital still camera CAM. The user determines the composition of the object image while viewing the liquid crystal monitor M, then pressing a release button B1 to capture the object image by the picture element C, and stores it in memory, which is not illustrated.

The image-capturing lens is constituted by a later mentioned zoom lens ZL according to the embodiment. In the digital still camera CAM, an auxiliary light emitting portion D, which emits light when the object is dark, a wide (W)-tele (T) button B2, for zooming the image-capturing lens (zoom lens ZL) from the wide-angle end state (W) to the telephoto end state (T), and a function button B3, which is used for setting various conditions for the digital still camera CAM, are disposed.

The zoom lens ZL comprises, in order from the object, a first lens group G1 having positive refractive power, a second lens group G2 having negative refractive power, a third lens group G3 having positive refractive power, and a fourth lens group G4 having positive refractive power. The first to the fourth lens groups G1 to G4 move along the optical axis respectively (e.g. see FIG. 1) upon zooming from a wide-angle end state to a telephoto end state, whereby the distance between the first lens group G1 and the second lens group G2, the distance between the second lens group G2 and the third lens group G3, and the distance between the third lens group G3 and the fourth lens group G4 change respectively. A filter group FL constituted by a low pass filter or infrared cut-off filter is disposed between the zoom lens ZL and the image plane I.

The first lens group G1 further comprises, in order from the object, a negative lens and a positive meniscus lens having a convex surface facing the object. The second lens group G2 further comprises, in order from the object, a first negative lens, a second negative lens, and a positive meniscus lens having a convex surface facing the object. The fourth lens group G4 further comprises one positive lens.

In the zoom lens ZL having this configuration, it is preferable that the following conditional Expressions (1) to (3) are satisfied, where Nd11 denotes a refractive index of the negative lens closest to the object in the first lens group G1, Nda denotes a refractive index of the lens closest to the object out of at least two lenses in the second to fourth lens groups G2 to G4, and Ndb denotes a refractive index of the lens at the image side of the lens closest to the object in the at least two lenses. Then the total optical length can be decreased and various aberrations can be corrected well, so a zoom lens ZL which is compact and has high optical performance while having about an X7 zoom ratio, and an optical apparatus (digital still camera CAM) having this zoom lens, can be obtained. In particular, a strong effect is implemented in a zoom lens ZL which forms an image of an object on an imaging plane of a solid-state image sensor, which includes the present embodiment.

$$1.90 < Nd11 < 2.50 \quad (1)$$

$$1.90 < Nda < 2.50 \quad (2)$$

$$1.86 < Ndb < 2.50 \quad (3)$$

Here the conditional Expression (1) specifies the refractive index of the negative lens closest to the object in the first lens group G1. If the condition exceeds the upper limit value of the conditional Expression (1), correction of the spherical aberration in the telephoto end state becomes difficult. Correction of the spherical aberration in the telephoto end state also becomes difficult when the condition is below the lower limit value of the conditional Expression (1).

If the lower limit value of the conditional Expression (1) is 1.92 or if the upper limit value of the conditional Expression (1) is 2.30, the effect of the present invention can be exhibited better. If the lower limit value of the conditional Expression (1) is 1.93, or if the upper limit value of the conditional Expression (1) is 2.10, then the effect of the present invention can be exhibited to the fullest.

The conditional Expression (2) specifies the refractive index of the lens closest to the object out of at least two lenses in the second to the fourth lens groups G2 to G4. If the condition exceeds the upper limit value of the conditional Expression (2), correction of curvature of field becomes difficult. If the condition is below the lower limit value of the conditional Expression (2), on the other hand, correction of coma aberration becomes difficult.

If the lower limit value of the conditional Expression (2) is 1.92, or if the upper limit value of the conditional Expression (2) is 2.30, the effect of the present invention can be exhibited better. If the lower limit value of the conditional Expression (2) is 1.93, or if the upper limit value of the conditional Expression (2) is 2.10, then the effect of the present invention can be exhibited to the fullest.

The conditional Expression (3) specifies the refractive index of the lens at the image side of at least two lenses in the second to the fourth lens groups G2 to G4. If the condition exceeds the upper limit value of the conditional Expression (3), correction of the spherical aberration and coma aberration beauties different. Correction of the spherical aberration and coma aberration also becomes difficult when the condition is below the lower limit value of the conditional Expression (3).

If the lower limit value of the conditional Expression (3) is 1.88, or if the upper limit value of the conditional Expression (3) is 2.30, the effect of the present invention can be exhibited better. If the lower limit value of the conditional Expression (3) is 1.89, or if the upper limit value of the conditional Expression (3) is 2.10, then the effect of the present invention can be exhibited to the fullest.

In this zoom lens ZL, it is preferable that the following conditional Expression (4) is satisfied:

$$1.00 < TLt/ft < 1.80 \quad (4)$$

where TLt denotes a total length of the zoom lens ZL in the telephoto end state, and ft denotes a focal length of the zoom lens ZL in the telephoto end state.

The conditional Expression (4) specifies the total length of the zoom lens ZL in the telephoto end state. If the condition exceeds the upper limit value of the conditional Expression (4), the total length of the zoom lens ZL becomes long, and compactness cannot be implemented. Correction of curvature of field also becomes difficult. If the condition is below the lower limit value of the conditional Expression (4), on the other hand, correction of spherical aberration becomes difficult.

If the lower limit value of the conditional Expression (4) is 1.20, or if the upper limit value of the conditional Expression (4) is 1.39, the effect of the present invention can be exhibited better.

In this zoom lens ZL, it is preferable that the conditional Expression (5) is satisfied:

$$0.20 < X1/ft < 0.60 \quad (5)$$

where X1 denotes a moving amount of the first lens group G1 upon zooming from the wide-angle end state to the telephoto end state, and ft denotes a focal length of the zoom lens ZL in the telephoto end state.

The conditional Expression (5) specifies the moving amount of the first lens group G1 upon zooming. If the condition exceeds the upper limit value of the conditional Expression (5), the total length of the zoom lens ZL becomes long, and compactness cannot be implemented, and correction of curvature of field also becomes difficult. If the condition is below the lower limit value of the conditional Expression (5), on the other hand, correction of spherical aberration becomes difficult.

If the lower limit value of the conditional Expression (5) is 0.25, or if the upper limit value of the conditional Expression. (5) is 0.37, the effect of the present invention can be exhibited better.

In the zoom lens ZL, it is preferable that the following conditional Expression (6) is satisfied:

$$4.00 < f1/fw < 8.00 \quad (6)$$

where f1 denotes a focal length of the first lens group G1, and fw denotes a focal length of the zoom lens ZL in the wide-angle end state.

The conditional Expression (6) specifies the relationship of the focal length of the first lens group G1 and the focal length of the zoom lens ZL in the wide-angle end state. If the condition exceeds the upper limit value of the conditional Expression (6), correction of distortion in the wide-angle end state becomes difficult. If the condition is below the lower limit value of the conditional Expression (6), on the other hand, correction of spherical aberration in the telephoto end state becomes difficult.

If the lower limit value of the conditional Expression (6) is 5.00, or if the upper limit value of the conditional Expression (6) is 7.00, the effect of the present invention can be exhibited better.

In the zoom lens ZL, it is preferable that the following conditional Expression (7) is satisfied:

$$0.80 < (-f2)/fw < 1.50 \quad (7)$$

where f2 denotes a focal length of the second lens group G2, and fw denotes a focal length of the zoom lens ZL in the wide-angle end state.

The conditional Expression (7) specifies the relationship of the focal length of the second lens group G2 and the focal length of the zoom lens ZL in the wide-angle end state. If the condition exceeds the upper limit value of the conditional Expression (7), correction of coma aberration becomes difficult. If the condition is below the lower limit value of the conditional Expression (7), on the other hand, fluctuation of curvature of field upon zooming increases.

If the lower limit value of the conditional Expression (7) is 1.00, or if the upper limit value of the conditional Expression (7) is 1.22, the effect of the present invention can be exhibited better.

In the zoom lens ZL, it is preferable that the following conditional Expression (8) is satisfied:

$$1.20 < f3/fw < 2.00 \quad (8)$$

where f3 denotes a focal length of the third lens group G3, and fw denotes a focal length of the zoom lens ZL in the wide-angle end state.

The conditional Expression (8) specifies the relationship of the focal length of the third lens group G3 and the focal length of the zoom lens ZL in the wide-angle end state. If the condition exceeds the upper limit value of the conditional Expression (8), correction of spherical aberration becomes difficult. If the condition is below the lower limit value of the conditional Expression (8), on the other hand, fluctuation of coma aberration upon zooming increases.

If the lower limit value of the conditional Expression (8) is 1.50, or if the upper limit value of the conditional Expression (8) is 1.75, the effect of the present invention can be exhibited better.

In the zoom lens ZL, it is preferable that the following conditional Expression (9) is satisfied:

$$2.00 < f4/fw < 5.00 \quad (9)$$

where f4 denotes a focal length of the fourth lens group G4, and fw denotes a focal length of the zoom lens ZL in the wide-angle end state.

The conditional Expression (9) specifies the relationship of the focal length of the fourth lens group G4 and the focal length of the focal length of the zoom lens ZL in the wide-angle end state. If the condition exceeds the upper limit value of the conditional Expression (9), correction of the curvature of field becomes difficult. Correction of curvature of field also becomes difficult when the condition is below the lower limit value of the conditional Expression (9).

If the lower limit value of the conditional Expression (9) is 3.00, or if the upper limit value of the conditional Expression (9) is 3.78, the effect of the present invention can be exhibited better.

It is preferable that the lens that specifies the conditional Expression (2) is one of the lenses of the second lens group G2, and more specifically, the positive meniscus lens closest to the image in the second lens group G2. Then curvature of field and coma aberration can be effectively corrected. It is preferable that the lens that satisfies the conditional Expression (3) is at least one of the lenses in the third lens group G3. Then spherical aberration and coma aberration can be corrected effectively.

In this zoom lens ZL, it is preferable that the first lens group G1 has an aspherical surface. Then various aberrations, such as spherical aberration, can be corrected well. It is preferable that the second lens group G2 has an aspherical surface, whereby various aberrations, such as spherical aberration, can be corrected well. It is preferable that the third lens group G3 has an aspherical surface, whereby various aberrations, such as spherical aberration, can be corrected well. And it is preferable that the fourth lens group G4 has an aspherical surface, whereby various aberrations, such as spherical aberration, can be corrected well.

In this zoom lens ZL, it is preferable that the fourth lens group G4 is constituted by lenses formed of a resin material. Then the lenses constituting the fourth lens group G4 can be processed In this zoom lens ZL, it is preferable that, upon zooming from the wide-angle end state to the telephoto end state, the first to the fourth lens groups G1 to G4 move along the optical axis respectively, so that the distance between the first lens group G1 and the second lens group G2 increases, the distance between the second lens group G2 and the third lens group G3 decreases, and the distance between the third lens group G3 and the fourth lens group G4 increases. Then fluctuation of various aberrations, such as spherical aberration, upon zooming, can be decreased.

Figure 8:
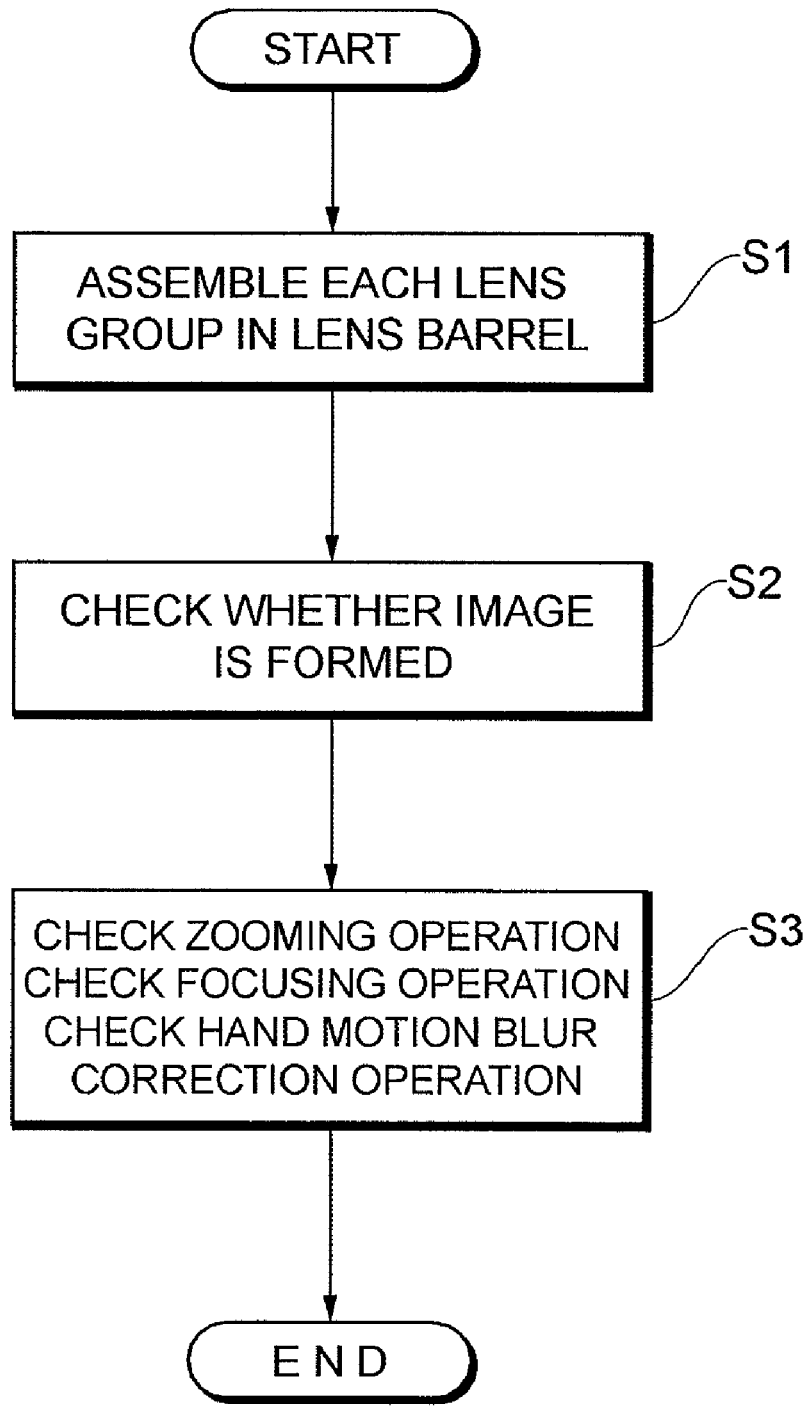
FIG. 8 is a flow chart depicting a method for manufacturing the zoom lens.

Now a method for manufacturing the zoom lens ZL having the above mentioned configuration will be described with reference to FIG. 8. First the first lens group G1, second lens group G2, third lens group G3 and fourth lens group G4 of the present embodiment are assembled in a cylindrical lens barrel (step S1). When each lens is assembled in the lens barrel, each lens group may be assembled in the lens barrel one at a time in order along the optical axis, or a part or all of the lens groups may be integratedly held on a holding member, and then assembled in the lens barrel. After assembling each lens group in the lens barrel like this, it is checked whether the object image is formed in a state where each lens group is assembled in the lens barrel, that is, whether the center of each lens group is aligned (step S2). After checking whether the image is formed, various operations of the zoom lens ZL are Checked (step S3).

Examples of various operations are a zoom operation in which lens groups for zooming (first to fourth lens groups G1 to G4 in this embodiment) move along the optical axis, a focusing operation in which a lens group which perform focusing from an object at a long distance to an object at a short distance (fourth lens group G4 in this embodiment) moves along the optical axis, and a hand motion blur correction operation in which at least a part of the lenses move so as to have components orthogonal to the optical axis. In the present embodiment, upon zooming, from the wide-angle end state to the telephoto end state, the distance between the first lens group G1 and the second lens group G2, the distance between the second lens group G2 and the third lens group G3, and the distance between the third lens group G3 and the fourth lens group G4, change respectively. The sequence of checking the various operations is arbitrary. According to this manufacturing method, a zoom lens ZL, which is compact and has high optical performance while having about an ×7 zoom ratio, can be obtained.

EXAMPLES

Example 1

Each example of the present invention will now be described with reference to the accompanying drawings. First Example 1 will be described with reference to FIG. 1, FIG. 2 and Table 1. FIG. 1 is a diagram depicting a configuration and zoom locus of a zoom lens according to Example 1. The zoom lens according to Example 1 comprises, in order from an object, a first lens group G1 having positive refractive power, a second lens group G2 having negative refractive power, an aperture stop S1, a third lens group G3 having positive refractive power, a flare cut stop S2 for preventing the entry of unnecessary lights, and a fourth lens group G4 having positive refractive power.

The first lens group G1 further comprises, in order from the object, a negative meniscus lens L11 having a convex surface facing the object, and a positive meniscus lens L12 having a convex surface facing the object, and the negative meniscus lens L11 and the positive meniscus lens L12 are cemented. A lens surface facing the image of the positive meniscus lens L12 is aspherical The second lens group G2 further comprises, in order from the object, a negative meniscus lens L21 having a convex surface facing the object, a biconcave negative lens L22, and a positive meniscus lens L23 having a convex surface facing the object, and both lens surfaces of the negative lens L22 are aspherical The third lens group G3 further comprises, in order from the object, a biconvex first positive lens L31, a biconvex second positive lens L32, and a biconcave negative lens L33, and the second positive lens L32 and the negative lens L33 are cemented. Both lens surfaces of the first positive lens L31 are aspherical. The fourth lens group G4 is constituted only by a biconvex positive lens L41, and the lens surface facing the object in the positive lens L41 is aspherical Focusing from an object at infinity to an object at finite distance is performed by moving the fourth lens group G4.

The aperture stop S1 is disposed near the object side of the first positive lens L31, which is disposed closest to the object in the third lens group G3, and moves together with the third lens group G3 upon zooming from the wide-angle end state to the telephoto end state. The flare cut stop S2 is disposed near the image side of the negative lens L33, which is disposed closest to the image in the third lens group G3, and moves together with the third lens group G3 upon zooming from the wide-angle end state to the telephoto end state. The filter group FL disposed between the fourth lens group G4 and the image plane I is constituted by a low pass filter or an infrared cut-off filter.

In the zoom lens ZL having this configuration, the first to fourth lens groups G1 to G4 move along the optical axis upon zooming from the wide-angle end state to the telephoto end state, whereby the distance between the first lens group G1 and the second lens group G2 increases, the distance between the second lens group G2 and the third lens group G3 decreases, and the distance between the third lens group G3 and the fourth lens group G4 increases. At this time, the first lens group G1 simply moves to the image side, the second lens group G2 moves to the image side gradually increasing speed, and the third lens group G3 simply moves to the object side, and the fourth lens group G4 moves to the object side once, then moves to the image side.

Table 1 to Table 3 shown below are tables listing the values of data on the zoom lenses according to Example 1 to Example 3. In [General Data] in each table, f is a focal length, FNO is an F number, ω is a half angle of view (maximum incident angle: unit is "°"), Y is image height, Bf is back focus (air conversion length), and TL is total lens length (air conversion length). In [Lens Data], the first column N shows a sequence of the lens surface counted from the object side, the second column R shows a radius of curvature of the lens surface, the third column D shows a distance between the lens surfaces, the fourth column nd shows a refractive index at d-line (wavelength λ=587.6 nm), and the fifth column νd shows an Abbe number at d-line (wavelength λ=587.6 nm). "*" attached at the right in the first column indicates that this lens surface is aspherical The radius of curvature "0.0000" indicates a plane.

In [Aspherical Data], the aspherical coefficient is given by the following conditional Expression (10), where y denotes the height in a direction perpendicular to the optical axis, X(y) denotes a distance from the tangential plane at a vertex of the aspherical surface to the position on the aspherical surface at height y along the optical axis, R denotes a radius of curvature (paraxial radius of curvature) of a reference spherical surface, κ is a conical coefficient, and An is an aspherical coefficient in degree n (n=4, 6, 8, 10). In each example, the aspherical coefficient A2 of degree 2 is 0, which is omitted here. In [Aspherical Data], [E−n] indicates x10$^{-n}$.

$$X(y)=(y^2/R)/\{1+(1-\kappa \times y^2/R^2)^{1/2}\}+A4\times y^4+A6\times y^6+A8\times y^8+A10\times y^{10} \quad (10)$$

In [Variable Distance Data], variable distance between each lens group is shown. "mm" is normally used for the unit of focal length f, radius of curvature R, surface distance D and other lengths in all data values herein below, but another appropriate unit may be used instead, since an equivalent optical performance is obtained even if an optical system is proportionally expanded or proportionally reduced. The same symbols as this example are also used in the data values in Example 2 and Example 3 to be described below.

Table 1 shows each data of Example 1. The surface numbers 1 to 22 in Table 1 correspond to surfaces 1 to 22 in FIG. 1, and the group numbers G1 to G4 in Table 1 correspond to each lens group G1 to G4 in FIG. 1. In Example 1, the third surface, sixth surface, seventh surface, eleventh surface, twelfth surface and seventeenth surface are formed to be aspherical

TABLE 1

| [General Data] | | |
| --- | --- | --- |
| Zoom ratio = 6.67 | | |
| Wide-angle | Intermediate | Telephoto end |
| f = 5.12 | 13.22 | 34.13 |
| FNO = 3.81 | 5.36 | 5.85 |
| 2ω = 79.5 | 34.7 | 13.9 |
| Y = 4.05 | | |
| Bf = 4.718 | 5.074 | 4.519 |
| TL = 35.418 | 41.483 | 47.021 |

| [Lens Data] | | | | |
| --- | --- | --- | --- | --- |
| N | R | D | nd | νd |
| 1 | 21.0505 | 0.8000 | 1.945950 | 17.98 |
| 2 | 13.9501 | 3.9000 | 1.851350 | 40.10 |
| 3* | 147.9135 | (d3) | 1.000000 | |
| 4 | 40.3153 | 0.8000 | 1.883000 | 40.77 |
| 5 | 5.7410 | 2.4000 | 1.000000 | |
| 6* | −700.0000 | 0.7000 | 1.851350 | 40.04 |
| 7* | 7.2742 | 0.5500 | 1.000000 | |
| 8 | 8.7056 | 1.4000 | 1.945950 | 17.98 |
| 9 | 36.0222 | (d9) | 1.000000 | |
| 10 | 0.0000 | −0.2500 | 1.000000 | (Aperture stop S1) |
| 11* | 4.9392 | 2.0000 | 1.495610 | 82.19 |
| 12* | −7.7613 | 0.4500 | 1.000000 | |
| 13 | 5.6401 | 1.4000 | 1.772500 | 49.61 |
| 14 | −1991.1000 | 0.4500 | 1.903660 | 31.27 |
| 15 | 3.2485 | 0.6000 | 1.000000 | |
| 16 | 0.0000 | (d16) | 1.000000 | (Flare cut stop S2) |
| 17* | 19.7012 | 2.5000 | 1.531130 | 55.73 |
| 18 | −17.6818 | (d18) | 1.000000 | |
| 19 | 0.0000 | 0.2100 | 1.516800 | 64.12 |
| 20 | 0.0000 | 0.3900 | 1.000000 | |
| 21 | 0.0000 | 0.5000 | 1.516800 | 64.12 |
| 22 | 0.0000 | (Bf) | 1.000000 | |

TABLE 1-continued

[Aspherical Data]

Third surface

κ = 1.0000, A4 = 5.83570E−06, A6 = −4.83260E−09,
A8 = 0.00000E+00, A10 = 0.00000E+00

Sixth surface

κ = 1.0000, A4 = −2.90730E−03, A6 = 2.77580E−04,
A8 = −1.08750E−05, A10 = 1.68000E−07

Seventh surface

κ = 1.3365, A4 = −3.25170E−03, A6 = 3.31210E−04,
A8 = −1.39660E−05, A10 = 2.33610E−07

Eleventh surface

κ = 1.6252, A4 = −2.53300E−03, A6 = −1.01600E−04,
A8 = 0.00000E+00, A10 = 0.00000E+00

Twelfth surface

κ = 3.8965, A4 = 1.07790E−03, A6 = 1.30970E−06,
A8 = 0.00000E+00, A10 = 0.00000E+00

Seventeenth surface

κ = 1.0000, A4 = 3.04690E−04, A6 = 1.11620E−05,
A8 = −6.96600E−07, A10 = 1.76830E−08

[Variable Distance Data]

| | Wide-angle | Intermediate | Telephoto end |
|---|---|---|---|
| d3 = | 0.49630 | 6.65420 | 14.51320 |
| d9 = | 10.61110 | 5.13800 | 1.41750 |
| d16 = | 1.89290 | 6.91710 | 8.87170 |
| d18 = | 3.44170 | 3.83370 | 3.26570 |

[Zoom Lens Group Data]

| Group number | First surface of group | Focal length of group |
|---|---|---|
| G1 | 1 | 30.215 |
| G2 | 4 | −5.947 |
| G3 | 11 | 8.420 |
| G4 | 17 | 17.961 |

[Conditional Expression Correspondence Value]

Conditional Expression (1) Nd11 = 1.945950
Conditional Expression (2) Nda = 1.945950
Conditional Expression (3) Ndb = 1.903660
Conditional Expression (4) TLt/ft = 1.378
Conditional Expression (5) X1/ft = 0.340
Conditional Expression (6) f1/fw = 5.901
Conditional Expression (7) (−f2)/fw = 1.161
Conditional Expression (8) f3/fw = 1.645
Conditional Expression (9) f4/fw = 3.508

In this way, all conditional Expressions (1) to (9) are satisfied in this example.

Figure 2A:
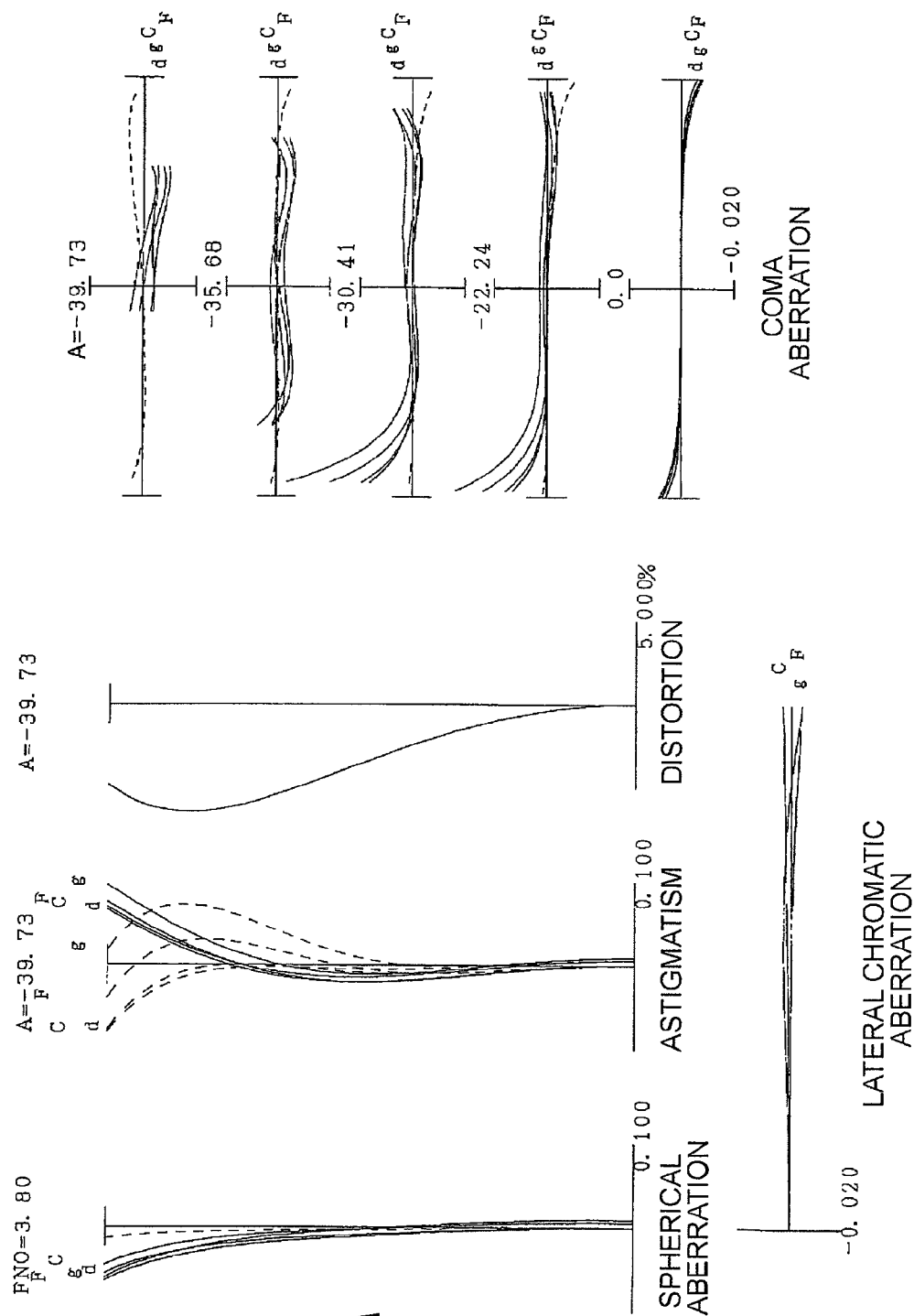
FIG. 2A are graphs showing various aberrations of the zoom lens according to Example 1 upon focusing on infinity in the wide-angle end state, FIG. 2B are graphs showing various aberrations of the zoom lens upon focusing on infinity in the intermediate focal length state, and FIG. 2C are graphs showing various aberrations of the zoom lens upon focusing on infinity in the telephoto end state.
Figure 2B:
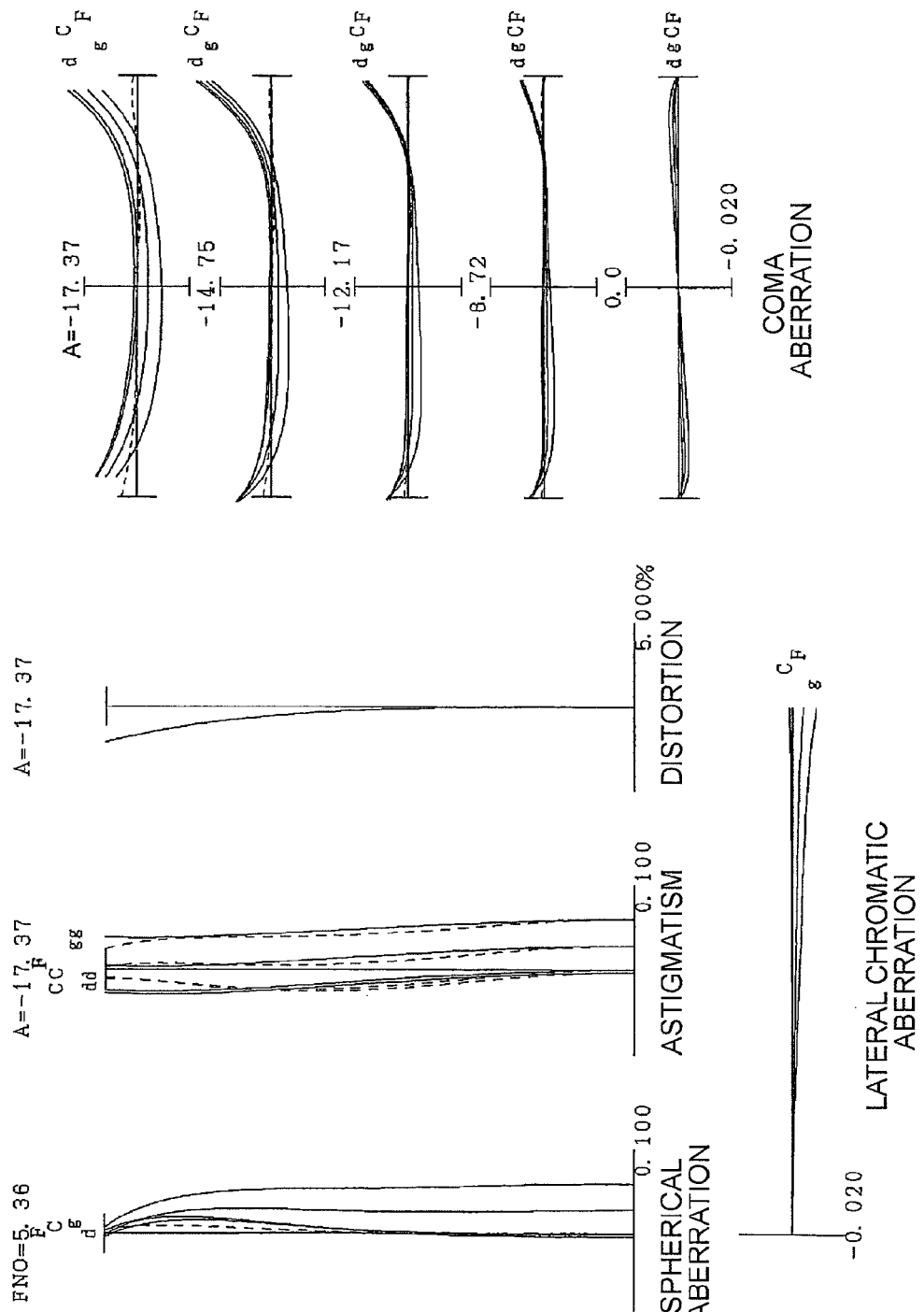
Figure 2C:
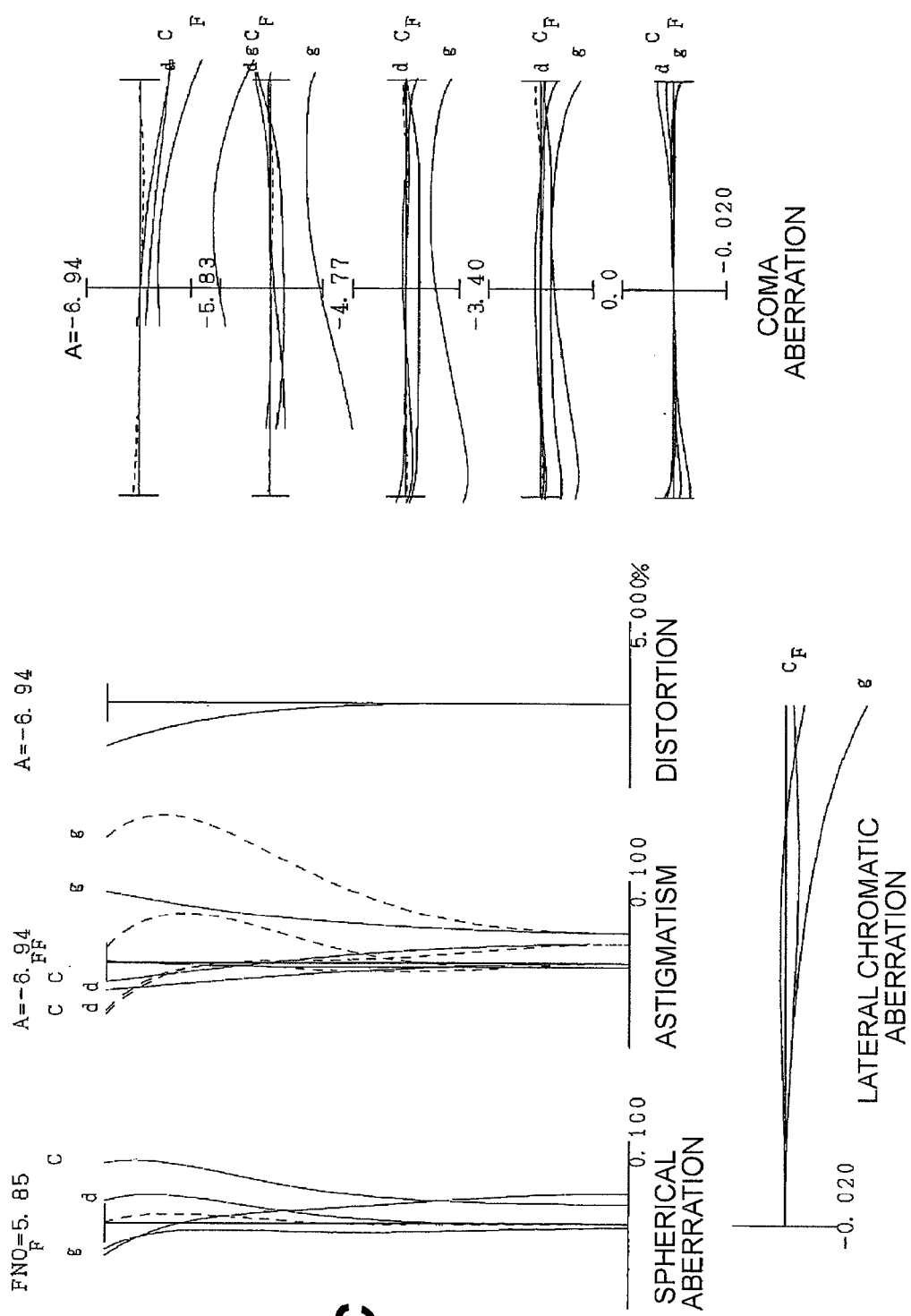

FIG. 2A to FIG. 2C are graphs showing various aberrations of the zoom lens ZL according to Example 1. In other words, FIG. 2A are graphs showing various aberrations of the zoom lens ZL upon focusing on infinity in the wide-angle end state (f=5.12 mm), FIG. 2B are graphs showing various aberrations of the zoom lens ZL upon focusing on infinity in the intermediate focal length state (f=13.22 mm), and FIG. 2C are graphs showing various aberrations of the zoom lens ZL upon focusing on infinity in the telephoto end state (f=34.13 mm). In each graph showing aberrations, FNO denotes an F number, and A denotes a half angle of view with respect to each image height. In each graph showing aberrations, d denotes d-line (λ=587.6 nm), g denotes g-line (λ=435.8 nm), C denotes C-line (λ=656.3 nm) and F denotes F-line (λ=486.1 nm). In the graph showing astigmatism, the solid line indicates the sagittal image surface, and the broken line indicates the meridional image surface. The description on the graphs showing aberrations is the same for other examples.

As seen in each graph showing aberrations, various aberrations are corrected well in each focal length state from the wide-angle end state to the telephoto end state in Example 1, indicating the presence of excellent optical performance. As a result, excellent optical performance can be assured for a digital still camera 1, which has the zoom lens ZL of Example 1, as well.

Example 2

Example 2 of the present invention will now be described with reference to FIG. 3, FIG. 4 and Table 2. FIG. 3 is a diagram depicting a configuration and zoom locus of a zoom lens according to Example 2. The zoom lens of Example 2 has a same configuration as the zoom lens of Example 1, and therefore each composing element is denoted with a same reference symbols as Example 1, and detailed description thereof is omitted.

Table 2 shows each data of Example 2. The surface numbers 1 to 22 in Table 2 correspond to surfaces 1 to 22 in FIG. 3, and the group numbers G1 to G4 in Table 2 correspond to each lens group G1 to G4 in FIG. 3. In Example 2, the third surface, sixth surface, seventh surface, eleventh surface, twelfth surface and seventeenth surface are formed to be aspherical.

TABLE 2

[General Data]
Zoom ratio = 6.67

| | Wide-angle | Intermediate | Telephoto end |
|---|---|---|---|
| f = | 5.12 | 13.20 | 34.14 |
| FNO = | 3.81 | 5.32 | 5.80 |
| 2ω = | 79.5 | 34.8 | 13.9 |
| Y = | 4.05 | | |
| Bf = | 4.732 | 5.089 | 4.531 |
| TL = | 35.430 | 41.474 | 47.035 |

[Lens Data]

| N | R | D | nd | νd |
|---|---|---|---|---|
| 1 | 21.0917 | 0.8000 | 1.945950 | 17.98 |
| 2 | 13.9621 | 3.9000 | 1.851350 | 40.10 |
| 3* | 150.3336 | (d3) | 1.000000 | |
| 4 | 40.6354 | 0.8000 | 1.883000 | 40.77 |
| 5 | 5.7700 | 2.4000 | 1.000000 | |
| 6* | −300.0000 | 0.7000 | 1.851350 | 40.04 |
| 7* | 7.3195 | 0.5500 | 1.000000 | |
| 8 | 8.7057 | 1.4000 | 1.945950 | 17.98 |
| 9 | 36.4690 | (d9) | 1.000000 | |
| 10 | 0.0000 | 0.3000 | 1.000000 | (Aperture stop S1) |
| 11* | 4.9498 | 2.0000 | 1.495890 | 82.24 |
| 12* | −7.7441 | 0.4500 | 1.000000 | |
| 13 | 5.6138 | 1.4000 | 1.772500 | 49.61 |
| 14 | −4336.0606 | 0.4500 | 1.903660 | 31.27 |
| 15 | 3.2337 | 0.6000 | 1.000000 | |
| 16 | 0.0000 | (d16) | 1.000000 | (Flare cut stop S2) |
| 17* | 20.0538 | 2.5000 | 1.531130 | 55.73 |
| 18 | −17.4087 | (d18) | 1.000000 | |
| 19 | 0.0000 | 0.2100 | 1.516800 | 64.12 |
| 20 | 0.0000 | 0.3900 | 1.000000 | |
| 21 | 0.0000 | 0.5000 | 1.516800 | 64.12 |
| 22 | 0.0000 | (Bf) | 1.000000 | |

[Aspherical Data]

Third surface

κ = 1.0000, A4 = 5.81060E−06, A6 = −4.76750E−09,
A8 = 0.00000E+00, A10 = 0.00000E+00

TABLE 2-continued

Sixth surface

κ = 1.0000, A4 = −2.88540E−03, A6 = 2.77170E−04,
A8 = −1.08830E−05, A10 = 1.68000E−07
Seventh surface κ = 1.3958, A4 = −3.23280E−03, A6 = 3.29380E−04,
A8 = −1.38780E−05, A10 = 2.29690E−07
Eleventh surface κ = 0.5277, A4 = −1.43380E−03, A6 = −4.99690E−05,
A8 = 0.00000E+00, A10 = 0.00000E+00
Twelfth surface κ = 1.9631, A4 = 5.50290E−04, A6 = −4.62800E−05,
A8 = 0.00000E+00, A10 = 0.00000E+00
Seventeenth surface κ = 1.0000, A4 = 3.10140E−04, A6 = 1.08000E−05,
A8 = −6.63950E−07, A10 = 1.67470E−08

[Variable Distance Data]

| | Wide-angle | Intermediate | Telephoto end |
|---|---|---|---|
| d3 = | 0.50000 | 6.63846 | 14.51775 |
| d9 = | 10.07233 | 4.60580 | 0.87827 |
| d16 = | 1.87611 | 6.89114 | 8.85759 |
| d18 = | 3.47365 | 3.83074 | 3.27292 |

[Zoom Lens Group Data]

| Group number | First surface of group | Focal length of group |
|---|---|---|
| G1 | 1 | 30.215 |
| G2 | 4 | −5.947 |
| G3 | 11 | 8.420 |
| G4 | 17 | 17.961 |

[Conditional Expression Correspondence Value]

Conditional Expression (1) Nd11 = 1.945950
Conditional Expression (2) Nda = 1.945950
Conditional Expression (3) Ndb = 1.903660
Conditional Expression (4) TLt/ft = 1.378
Conditional Expression (5) X1/ft = 0.340
Conditional Expression (6) f1/fw = 5.901
Conditional Expression (7) (−f2)/fw = 1.161
Conditional Expression (8) f3/fw = 1.645
Conditional Expression (9) f4/fw = 3.508

In this way, all conditional Expressions (1) to (9) are satisfied in this example.

Figure 4A:
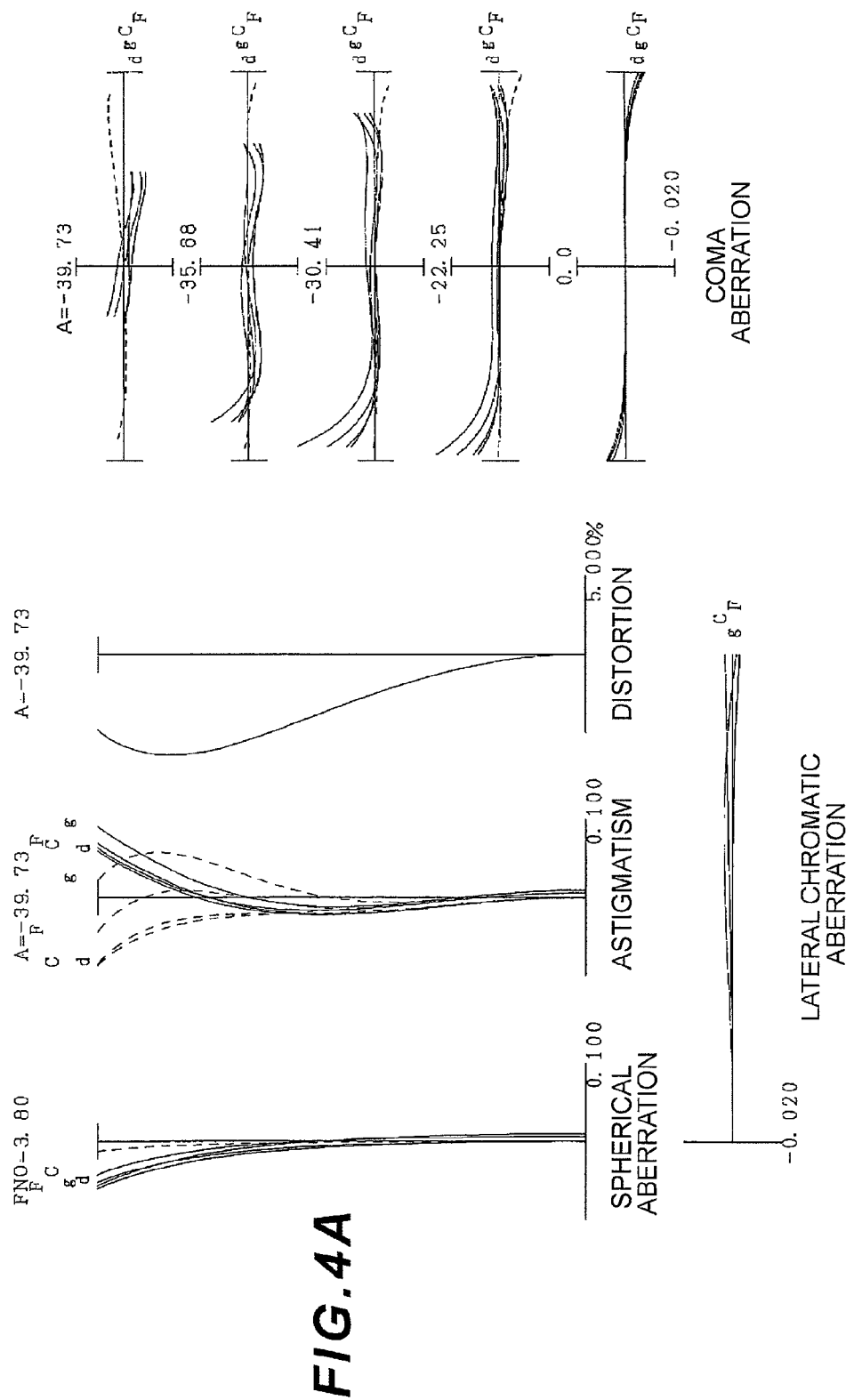
FIG. 4A are graphs showing various aberrations of the zoom lens according to Example 2 upon focusing on infinity in the wide-angle end state, FIG. 4B are graphs showing various aberrations of the zoom lens upon focusing on infinity in the intermediate focal length state, and FIG. 4C are graphs showing various aberrations of the zoom lens upon focusing on infinity in the telephoto end state.
Figure 4B:
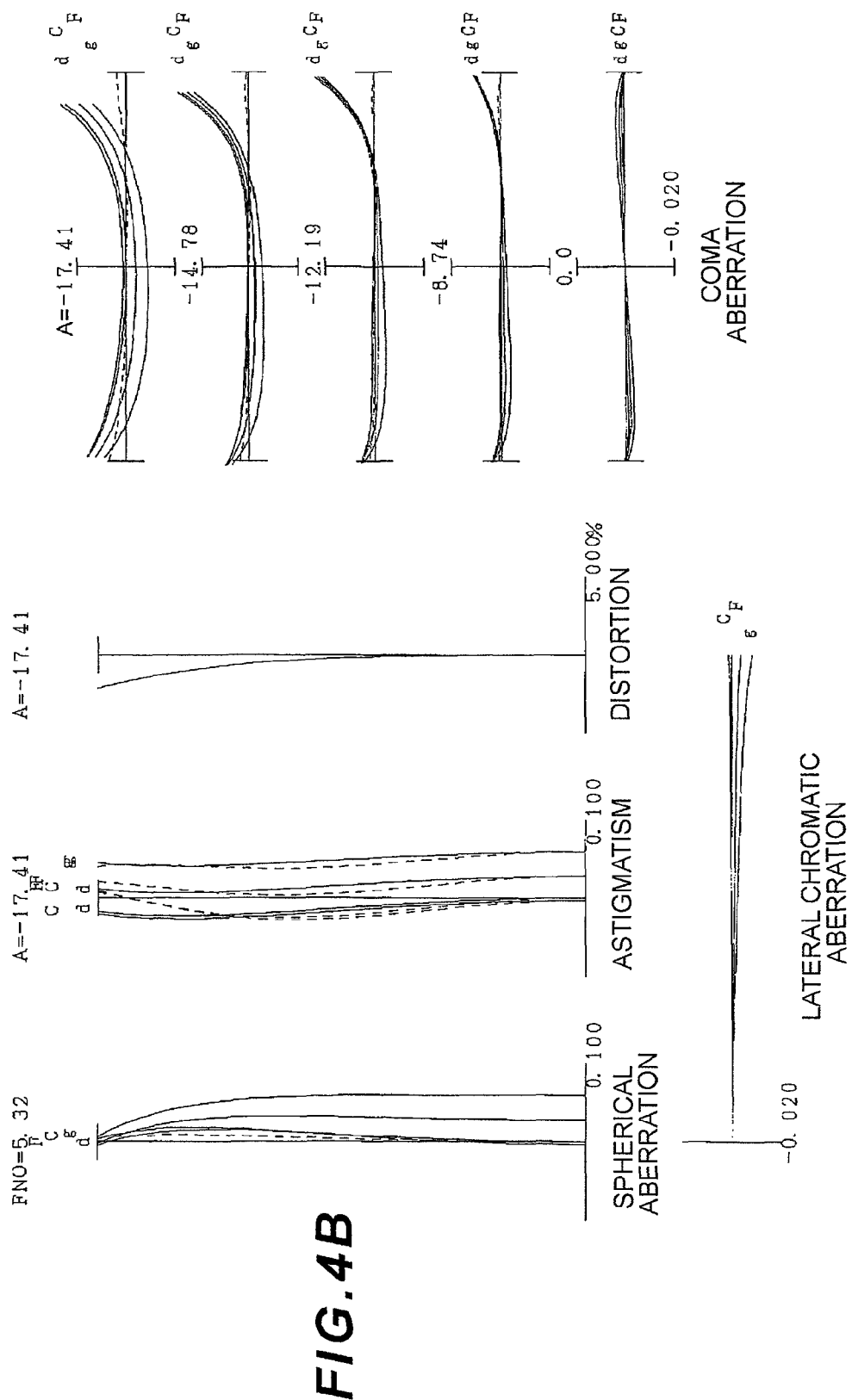
Figure 4C:
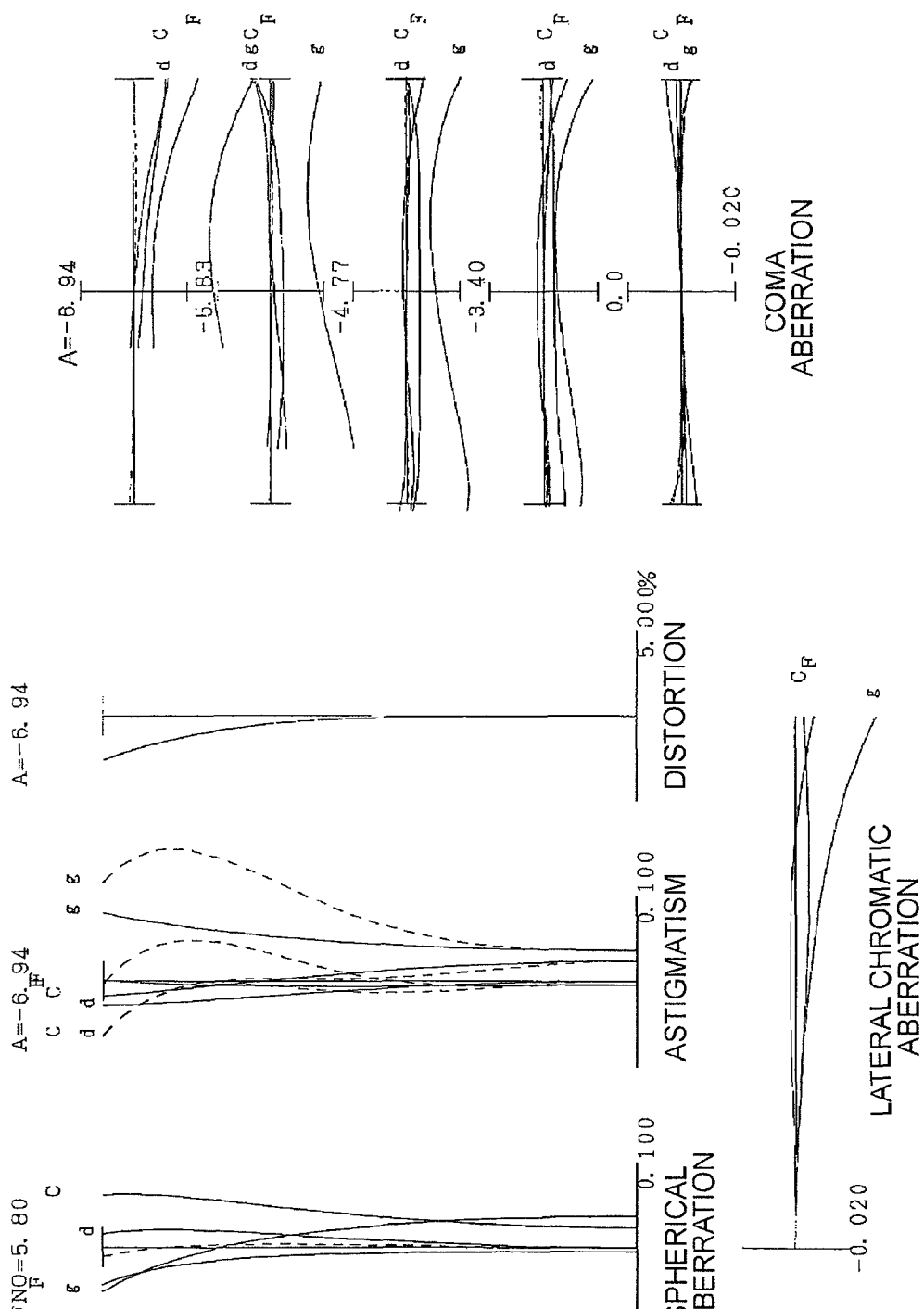

FIG. 4A to FIG. 4C are graphs showing various aberrations of the zoom lens ZL according to Example 2. In other words, FIG. 4A are graphs showing various aberrations of the zoom lens ZL upon focusing on infinity in the wide-angle end state (f=5.12 mm), FIG. 4B are graphs showing various aberrations of the zoom lens ZL upon focusing on infinity in the intermediate focal length state (f=13.20 mm), and FIG. 4C are graphs showing various aberrations of the zoom lens ZL upon focusing on infinity in the telephoto end state (f=34.14 mm). As seen in each graph showing aberrations, various aberrations are corrected well in each focal length state from the wide-angle end state to the telephoto end state in Example 2, indicating the presence of excellent optical performance. As a result, excellent optical performance can be assured for a digital still camera 1, which has the zoom lens ZL of Example 2, as well.

Example 3

Figure 5:
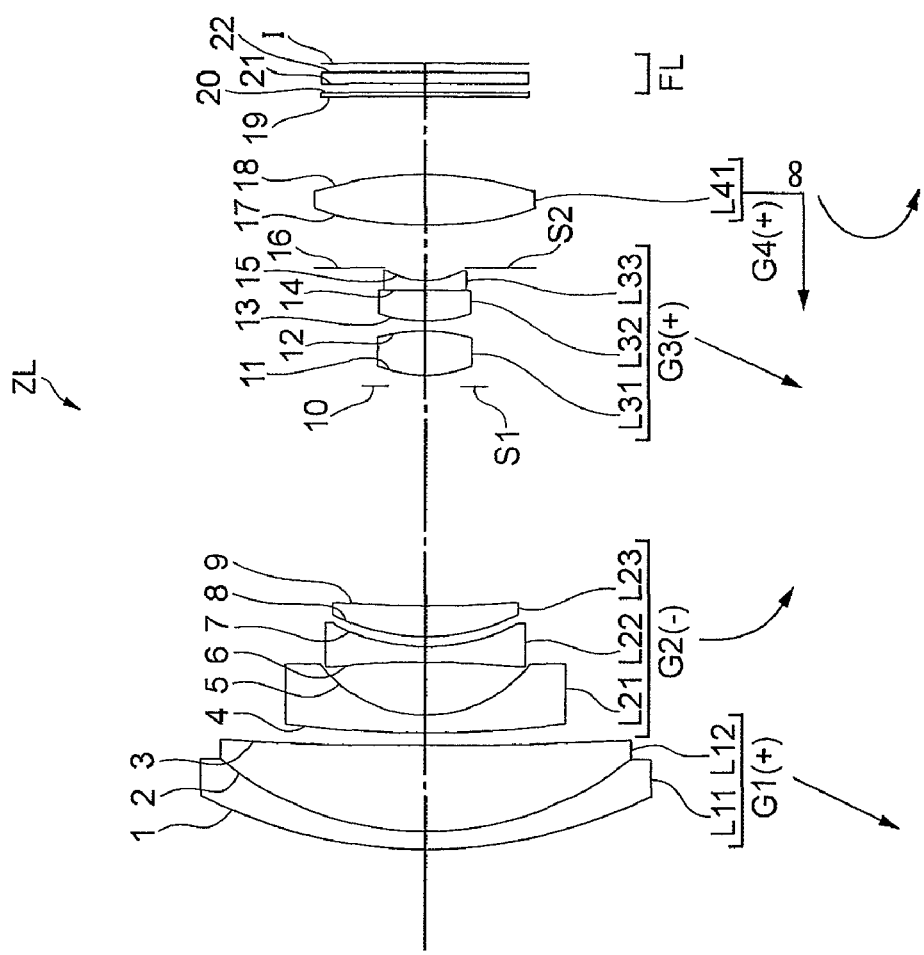
FIG. 5 is a diagram depicting a configuration and zoom locus of a zoom lens according to Example 3.

Example 3 of the present invention will now be described with reference to FIG. 5, FIG. 6 and Table 3. FIG. 5 is a diagram depicting a configuration and zoom locus of a zoom lens according to Example 3. The zoom lens of Example 3 has a same configuration as the zoom lens of Example 1, except for the shape of a part of the third lens group G3, therefore each composing element is denoted with a same reference symbol as Example 1, and detailed description thereof is omitted. In the third lens group G3 of Example 3, the second positive lens L32 is a positive meniscus lens having a convex surface facing the object, the negative lens L33 is a negative meniscus lens having a convex surface facing the object, and the second positive lens L32 and the negative lens L33 are cemented.

Table 3 shows each data of Example 3. The surface numbers 1 to 22 in Table 3 correspond to surfaces 1 to 22 in FIG. 5, and the group numbers G1 to G4 in Table 3 correspond to each lens group G1 to G4 in FIG. 5. In Example 3, the third surface, sixth surface, seventh surface, eleventh surface, twelfth surface and seventeenth surface are formed to be aspherical.

TABLE 3

[General Data]
Zoom ratio = 6.65

| | Wide-angle | Intermediate | Telephoto end |
|---|---|---|---|
| f = | 5.13 | 13.22 | 34.14 |
| FNO = | 3.77 | 5.26 | 5.74 |
| 2ω = | 79.4 | 34.7 | 13.9 |
| Y = | 4.05 | | |
| Bf = | 4.781 | 5.143 | 4.585 |
| TL = | 35.421 | 41.502 | 47.071 |

[Lens Data]

| N | R | D | nd | νd |
|---|---|---|---|---|
| 1 | 21.6074 | 0.8000 | 1.945950 | 17.98 |
| 2 | 14.1943 | 3.9000 | 1.851350 | 40.10 |
| 3* | 181.4111 | (d3) | 1.000000 | |
| 4 | 47.9081 | 0.8000 | 1.883000 | 40.77 |
| 5 | 5.8059 | 2.4000 | 1.000000 | |
| 6* | −1000.0000 | 0.7000 | 1.851350 | 40.04 |
| 7* | 7.3544 | 0.4500 | 1.000000 | |
| 8 | 8.7633 | 1.4000 | 1.945950 | 17.98 |
| 9 | 40.2377 | (d9) | 1.000000 | |
| 10 | 0.0000 | 0.5000 | 1.000000 | (Aperture stop S1) |
| 11* | 4.8464 | 2.0000 | 1.496970 | 82.42 |
| 12* | −7.6552 | 0.4500 | 1.000000 | |
| 13 | 5.7409 | 1.4000 | 1.772500 | 49.61 |
| 14 | 193.2589 | 0.4500 | 1.903660 | 31.27 |
| 15 | 3.2011 | 0.6000 | 1.000000 | |
| 16 | 0.0000 | (d16) | 1.000000 | (Flare cut stop S2) |
| 17* | 21.3643 | 2.3000 | 1.531130 | 56.19 |
| 18 | −15.9966 | (d18) | 1.000000 | |
| 19 | 0.0000 | 0.2100 | 1.516800 | 64.12 |
| 20 | 0.0000 | 0.3900 | 1.000000 | |
| 21 | 0.0000 | 0.5000 | 1.516800 | 64.12 |
| 22 | 0.0000 | (Bf) | 1.000000 | |

[Aspherical Data]

Third surface

κ = 1.0000, A4 = 5.65830E−06, A6 = −4.03790E−09,
A8 = 0.00000E+00, A10 = 0.00000E+00
Sixth surface κ = 1.0000, A4 = −2.99610E−03, A6 = 2.66240E−04,
A8 = −9.94400E−06, A10 = 1.45790E−07
Seventh surface κ = 1.4816, A4 = −3.37780E−03, A6 = 3.09620E−04,
A8 = −1.24590E−05, A10 = 1.92130E−07

TABLE 3-continued

Eleventh surface $\kappa = -0.0877, A4 = -8.86590E-04, A6 = -5.73010E-05,$
$A8 = 0.00000E+00, A10 = 0.00000E+00$ Twelfth surface $\kappa = 0.3677, A4 = 5.70870E-05, A6 = -6.80290E-05,$
$A8 = 0.00000E+00, A10 = 0.00000E+00$ Seventeenth surface $\kappa = -2.0974, A4 = 3.00910E-04, A6 = 1.83900E-05,$
$A8 = -1.04090E-06, A10 = 2.27840E-08$

[Variable Distance Data]

| Wide-angle | Intermediate | Telephoto end |
|---|---|---|
| d3 = 0.57845 | 6.74802 | 14.63847 |
| d9 = 9.98000 | 4.51736 | 0.78594 |
| d16 = 1.93061 | 6.94342 | 8.91209 |
| d18 = 3.52338 | 3.88512 | 3.32684 |

[Zoom Lens Group Data]

| Group number | First surface of group | Focal length of group |
|---|---|---|
| G1 | 1 | 30.309 |
| G2 | 4 | -5.976 |
| G3 | 11 | 8.415 |
| G4 | 17 | 17.547 |

[Conditional Expression Correspondence Value]

Conditional Expression (1) Nd11 = 1.945950
Conditional Expression (2) Nda = 1.945950
Conditional Expression (3) Ndb = 1.903660
Conditional Expression (4) TLt/ft = 1.379
Conditional Expression (5) X1/ft = 0.341
Conditional Expression (6) f1/fw = 5.908
Conditional Expression (7) (-f2)/fw = 1.165
Conditional Expression (8) f3/fw = 1.640
Conditional Expression (9) f4/fw = 3.421

In this way, all conditional Expressions (1) to (9) are satisfied in this example.

Figure 6A:
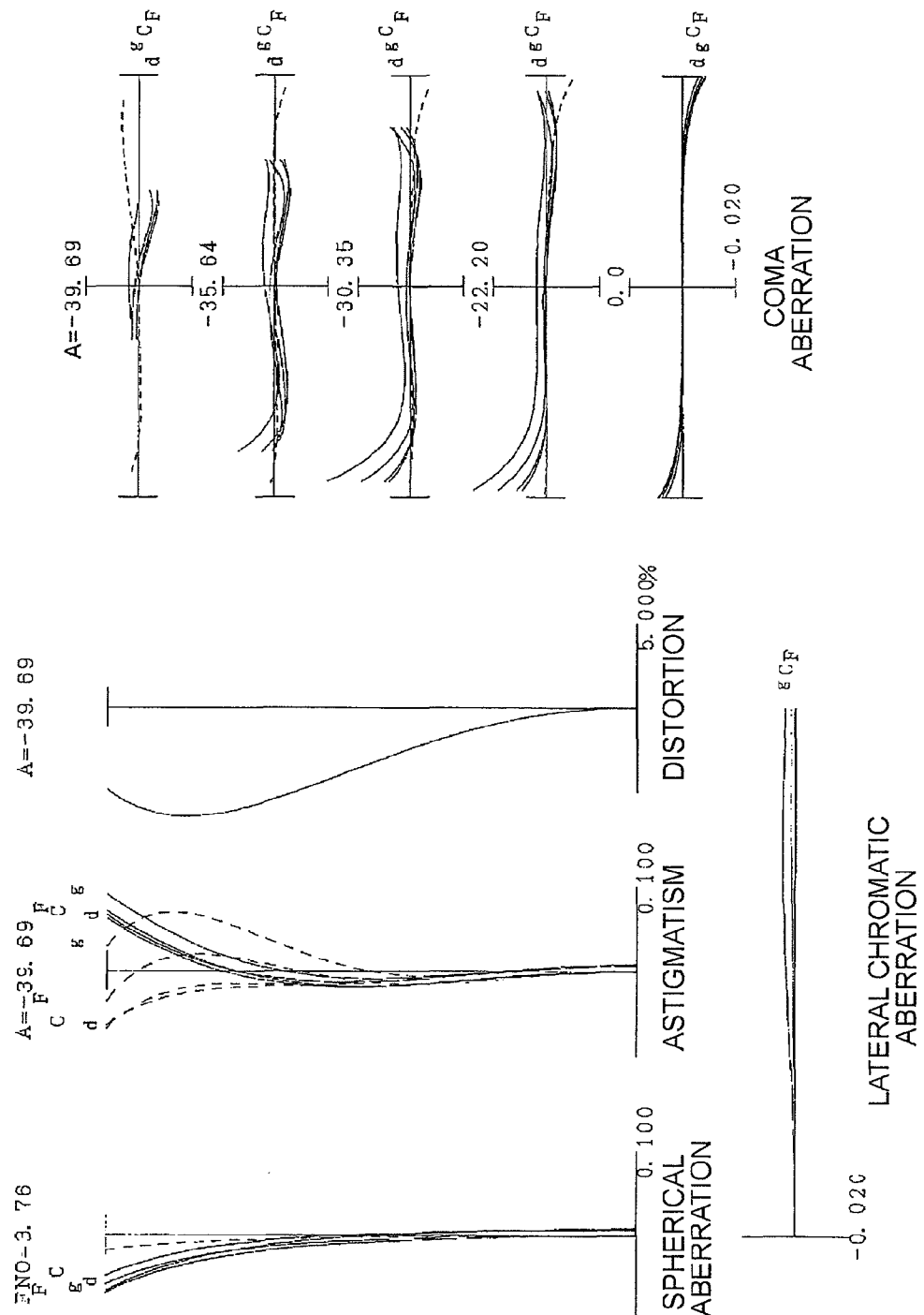
FIG. 6A are graphs showing various aberrations of the zoom lens according to Example 3 upon focusing on infinity in the wide-angle end state, FIG. 6B are graphs showing various aberrations of the zoom lens upon focusing on infinity in the intermediate focal length state, and FIG. 6C are graphs showing various aberrations of the zoom lens upon focusing on infinity in the telephoto end state.
Figure 6B:
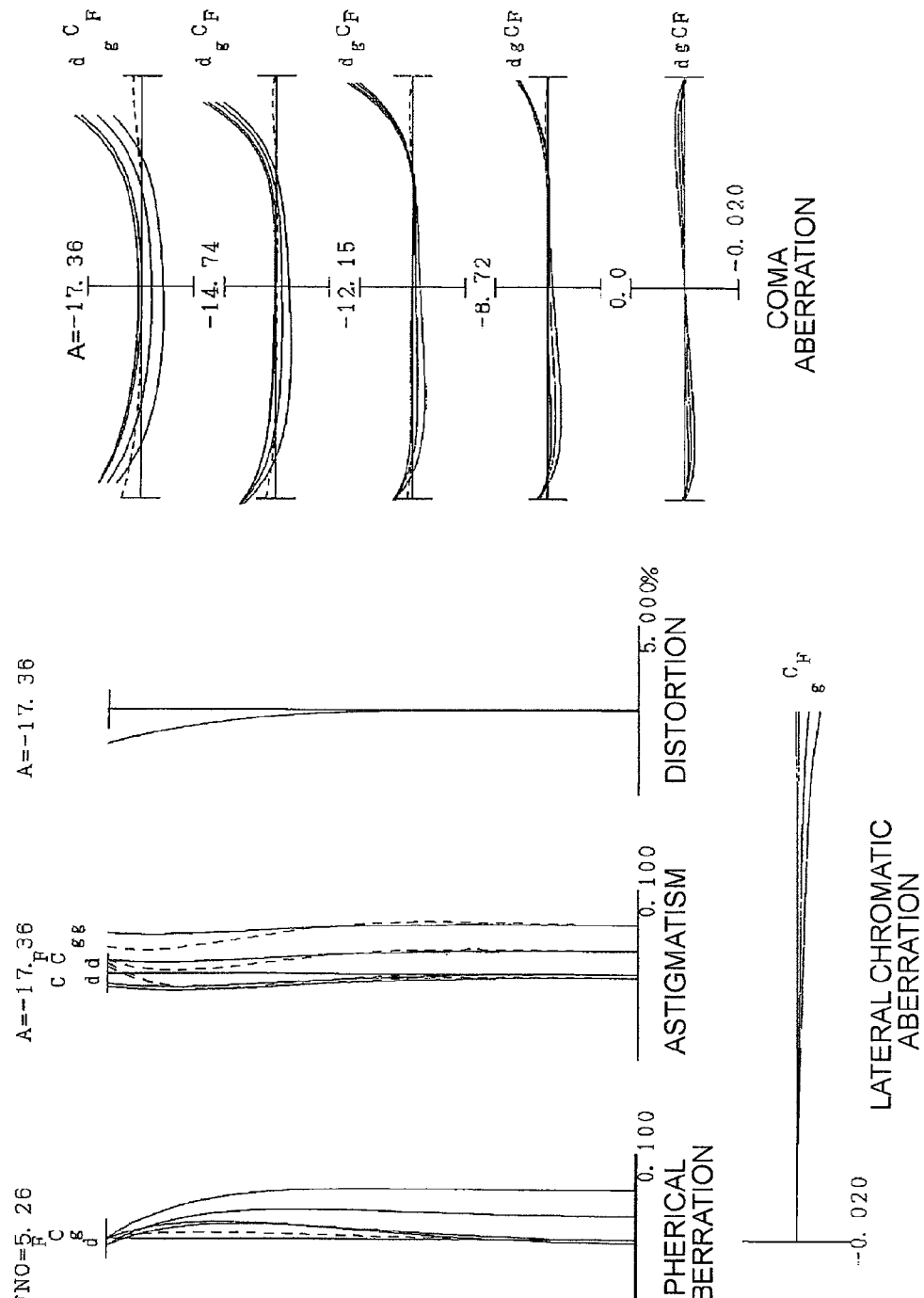
Figure 6C:
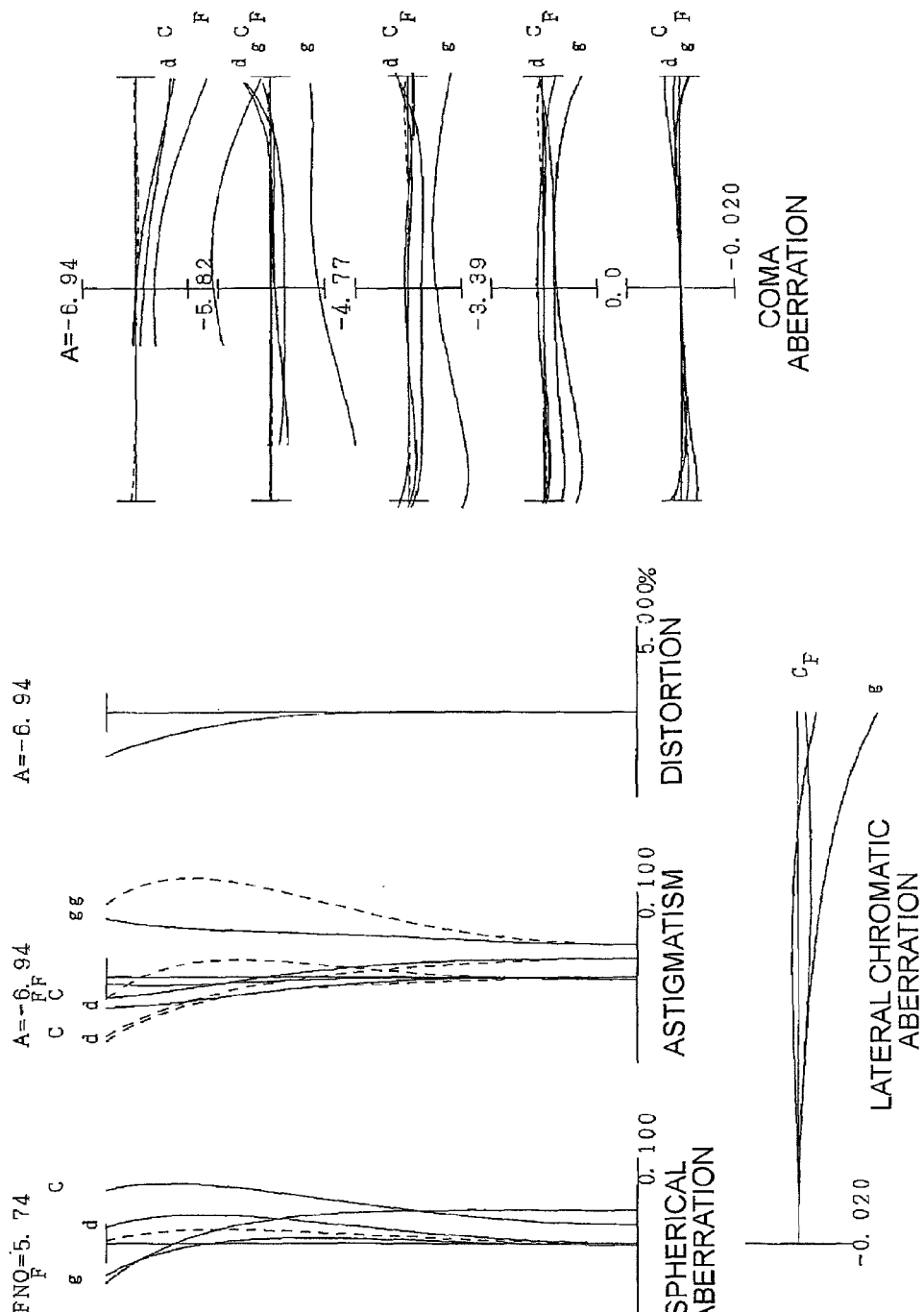

FIG. 6A to FIG. 6C are graphs showing various aberrations of the zoom lens ZL according to Example 3. In other words, FIG. 6A are graphs showing various aberrations of the zoom lens ZL upon focusing on infinity in the wide-angle end state (f=5.13 mm), FIG. 6B are graphs showing various aberrations of the zoom lens ZL upon focusing on infinity in the intermediate focal length state (f=13.22 mm), and FIG. 6C are graphs showing various aberrations of the zoom lens ZL upon focusing on infinity in the telephoto end state (f=34.14 mm). As seen in each graph showing aberrations, various aberrations are corrected well in each focal length state from the wide-angle end state to the telephoto end state in Example 3, indicating the presence of excellent optical performance. As a result, excellent optical performance can be assured for a digital still camera 1, which has the zoom lens ZL of Example 3, as well.

According to each example, a zoom lens and optical apparatus (digital still camera), which are suitable for high pixel solid-state image sensors, and have excellent optical performance with about an X7 zoom ratio, can be implemented.

In the above embodiment, the following content can be adopted within a range where the optical performance is not diminished.

In each of the above mentioned examples, a zoom lens comprised of four lens groups was shown, but the present invention can also be applied to a configuration using a different number of lens groups, such as five lens groups or six lens groups. In the configuration, a lens or a lens group may be added to the side closest to the object, or a lens or a lens group may be added to the side closest to the image. A lens group refers to a portion having at least one lens isolated by an air space which changes upon zooming.

A single or a plurality of lens group(s) or a partial lens group may be designed to be a focusing lens group which performs focusing from an object at infinity to an object at close distance by moving in the optical axis direction. This focusing lens group can be applied to auto focus, and is also suitable for driving a motor for auto focusing (e.g. driving using an ultrasonic motor). It is particularly preferable that the fourth lens group is designed to be the focusing lens group.

A lens group or a partial lens group may be designed to be a vibration-isolating lens group, which corrects image blurs generated by hand motion by moving the lens group or the partial lens group so as to have components orthogonal to the optical axis, or rotating (oscillating) the lens group or the partial lens group in an in-plane direction including the optical axis. It is particularly preferable that at least a part of the second lens group is designed to be the vibration-isolating lens group.

The lens surface Maybe formed to be a spherical surface or a plane, or an aspherical surface. If the lens surface is a spherical surface or a plane, then lens processing, assembly and adjustment are easy, and deterioration of optical performance, due to an error in processing, assembly and adjustment can be prevented. Even if the image plane is shifted, the drawing performance is not affected very much, which is desirable. If the lens surface is an aspherical surface, the aspherical surface can be any aspherical surface out of an aspherical surface generated by grinding, a glass molded aspherical surface generated by forming glass in an aspherical shape using a die, and a composite-aspherical surface generated by forming a resin on the surface of the glass to be an aspherical shape. The lens surface may be a diffraction surface, and the lens may be a refractive index distributed lens (GRIN lens) or plastic lens.

It is preferable that the aperture stop is disposed near the third lens group, but the role of the aperture stop maybe substituted by the frame of the lens, without disposing a separate element as the aperture stop.

Each lens surface may be coated by an anti-reflection film which has high transmittance in a wide wave length region, in order to decrease flares and ghosts, and implement a high optical performance with high contrast.

The zoom ratio of the zoom lens (zooming optical system) of the present embodiment is about 5 to 10.

In the zoom lens (zooming optical system) of the present embodiment, it is preferable that the first lens group has one positive lens component. It is preferable that the second lens group has one positive lens component and two negative lens components. At this time, it is preferable that the lens components are disposed, in order from the object, to be in the sequence of negative, negative and positive, with air space there between. It is preferable that the third lens group has one positive lens component and one negative lens component, or two positive lens components. It is preferable that the fourth lens group has one positive lens component.

The zoom lens (zooming optical system) of the present embodiment is used for a digital still camera, but the present invention is not limited to this, but can also be used for such an optical apparatus as a digital video camera.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A zoom lens comprising, in order from an object:
    a first lens group having positive refractive power; a second lens group having negative refractive power, a third lens group having positive refractive power; and a fourth lens group having positive refractive power,
    a distance between the first lens group and the second lens group, a distance between the second lens group and the third lens group, and a distance between the third lens group and the fourth lens group changing respectively upon zooming from a wide-angle end state to a telephoto end state,
    the first lens group including, in order from the object, a negative lens and a positive meniscus lens having a convex surface facing the object,
    the second lens group including, in order from the object, a first negative lens, a second negative lens, and a positive meniscus lens having a convex surface facing the object,
    the fourth lens group including one positive lens, and
    the following conditional expressions being satisfied:

$1.90 < Nd11 < 2.50$ $1.90 < Nda < 2.50$ $1.86 < Ndb < 2.50$ where Nd11 denotes a refractive index of the negative lens closest to the object in the first lens group, Nda denotes a refractive index of the lens closest to the abject out of at least two lenses in the second lens group, the third lens group and the fourth lens group, and Ndb denotes a refractive index of the lens closer to an image than the lens closest to the object out of the at least two lenses.

2. The zoom lens according to claim 1, wherein the following conditional expression is satisfied:

$1.00 < TLt/ft < 1.80$ where TLt denotes a total length of the zoom lens in the telephoto end state, and ft denotes a focal length of the zoom lens in the telephoto end state.

3. The zoom lens according to claim 1, wherein the following conditional expression is satisfied:

$0.20 < X1/ft < 0.60$ where X1 denotes a moving amount of the first lens group upon zooming from the wide-angle end state to the telephoto end state, and ft denotes a focal length of the zoom lens in the telephoto end state.

4. The zoom lens according to claim 1, wherein the following conditional expression is satisfied:

$4.00 < f1/fw < 8.00$ where f1 denotes a focal length of the first lens group, and fw denotes a focal length of the zoom lens in the wide-angle end state.

5. The zoom lens according to claim 1, wherein the following conditional expression is satisfied:

$0.80 < (-f2)/fw < 1.50$ where f2 denotes a focal length of the second lens group, and fw denotes a focal length of the zoom lens in the wide-angle end state.

6. The zoom lens according to claim 1, wherein the following conditional expression is satisfied:

$1.20 < f3/fw < 2.00$ where f3 denotes a focal length of the third lens group, and fw denotes a focal length of the zoom lens in the wide-angle end state.

7. The zoom lens according to claim 1, wherein the following conditional expression is satisfied:

$2.00 < f4/fw < 5.00$ where f4 denotes a focal length of the fourth lens group, and fw denotes a focal length of the zoom lens in the wide-angle end state.

8. The zoom lens according to claim 1, wherein the lens closest to the object out of the at least two lenses is one of the lenses of the second lens group.

9. The zoom lens according to claim 8, wherein the one of the lenses of the second lens group is a positive meniscus lens closest to the object in the second lens group.

10. The zoom lens according to claim 1, wherein the lens closer to the image than the lens closest to the object out of the at least two lenses is at least one of the lenses of the third lens group.

11. The lens group according to claim 1, wherein the first lens group has an aspherical surface.

12. The zoom lens according to claim 1, wherein the second lens group has an aspherical surface.

13. The zoom lens according to claim 1, wherein the third lens group has an aspherical surface.

14. The zoom lens according to claim 1, wherein the fourth lens group has an aspherical surface.

15. The zoom lens according to claim 1, wherein the fourth lens group is constituted by lenses formed of resin material.

16. The zoom lens according to claim 1, wherein the first lens group, the second lens group, the third lens group and the fourth lens group move along an optical axis respectively upon zooming from the wide-angle end state to the telephoto end sate, so that the distance between the first lens group and the second lens group increases, the distance between the second lens group and the third lens group decreases, and the distance between the third lens group and the fourth lens group increases.

17. The zoom lens according to claim 1, wherein an image of an object is formed on an imaging surface of a solid-state image sensor.

18. An optical apparatus comprising a zoom lens for forming an image of an object on a predetermined plane,
    the zoom lens being the zoom lens according to claim 1.

19. A method for manufacturing a zoom lens by disposing, in order from an object, a first lens group having positive refractive power, a second lens group having negative refractive power, a third lens group having positive refractive power, and a fourth lens group having positive refractive power,
    a distance between the first lens group and the second lens group, a distance between the second lens group and the third lens group, and a distance between the third lens group and the fourth lens group changing respectively upon zooming from a wide-angle end state to a telephoto end state,
    the first lens group including, in order from the object, a negative lens and a positive meniscus lens having a convex surface facing the object,
    the second lens group including, in order from the object, a first negative lens, a second negative lens, and a positive meniscus lens having a convex surface facing the object, the fourth lens group including one positive lens, and the following conditional expressions being satisfied:

$1.90 < Nd11 < 2.50$ $1.90 < Nda < 2.50$ $1.86 < Ndb < 2.50$ where Nd11 denotes a refractive index of the negative lens closest to the object in the first lens group, Nda denotes a refractive index of the lens closest to the object out of at least two lenses in the second lens group, the third lens group and the fourth lens group, and Ndb denotes a refractive index of the lens closer to an image than the lens closest to the object out of the at least two lenses.

* * * * *